Figure 1:
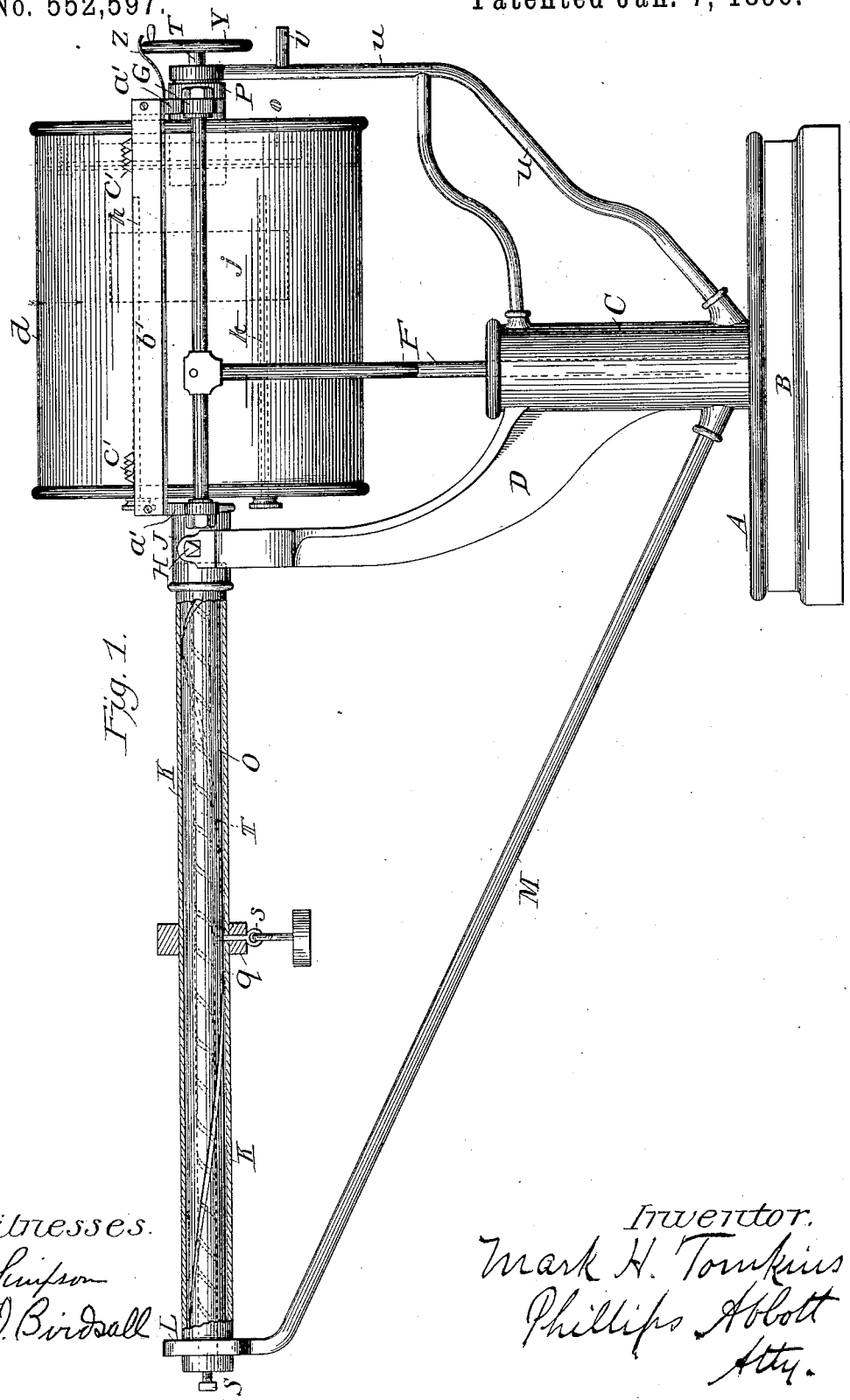

(No Model.) 3 Sheets—Sheet 1.
M. H. TOMKINS.
TESTING MACHINE.

No. 552,597. Patented Jan. 7, 1896.

Witnesses.
E. Simpson
W. D. Birdsall

Inventor.
Mark H. Tomkins
Phillips Abbott
Atty.

(No Model.) 3 Sheets—Sheet 2.

M. H. TOMKINS.
TESTING MACHINE.

No. 552,597. Patented Jan. 7, 1896.

Witnesses.
E. Simpson
W. D. Birdsall

Inventor.
Mark H. Tomkins
Phillips Abbott
Atty.

(No Model.)  M. H. TOMKINS.  3 Sheets—Sheet 3.
TESTING MACHINE.
No. 552,597.  Patented Jan. 7, 1896.

Witnesses.
E. Simpson
W. D. Birdsall

Inventor.
Mark H. Tomkins
Phillips Abbott
Atty

UNITED STATES PATENT OFFICE.

MARK H. TOMKINS, OF NEW YORK, N. Y.

TESTING-MACHINE.

SPECIFICATION forming part of Letters Patent No. 552,597, dated January 7, 1896.

Application filed June 11, 1895. Serial No. 552,490. (No model.)

*To all whom it may concern:*

Be it known that I, MARK H. TOMKINS, a citizen of the United States, and a resident of New York, in the county of New York and State of New York, have invented a certain new and useful Improved Testing-Machine, of which the following is a specification.

My invention relates to a new and useful apparatus especially intended for use by manufacturers and dealers in textile fabrics.

At the present time and for many years past it has been the custom by manufacturers of textile fabrics to indicate on the end of the piece, bolt, or cut of fabric the number of yards contained in it—as, for instance, on one corner of the fabric may appear the figures "47²," which reads that the piece contains forty-seven and two-fourths yards. This is an instance only taken from the print-cloth trade. The intent of that trade is to produce pieces or cuts containing fifty yards, but through shrinkage and other causes it frequently falls short or exceeds that amount somewhat.

In order to determine the quality of the goods—that is to say, its weight per yard—in other words, whether it be a closely-woven thick fabric or a loosely-woven thinner fabric, recourse has been had to a method known more particularly in the print-cloth and cotton-weavers' trade as the "yard-weight" system—in other words, a bale of goods is placed upon an ordinary platform-scale and its weight taken. Then each piece or bolt is examined, and the number of yards taken off is indicated by them from the indications printed or stamped upon each piece. Then all the yards are added together to get the total number, and the total weight in pounds is divided into the total number of yards. This gives, as nearly as has been heretofore attainable, the weight per yard; but it will be noticed that this is the average weight on the whole bale of, say, forty pieces, more or less, but does not give any indication of the yards per pound of each individual piece. To illustrate, assume, for convenience, that the bale comprises four pieces only, (there will ordinarily be forty pieces.) Each of these four pieces may weigh ten pounds—total weight, forty pounds—or two of them might weigh fifteen pounds each and the two others five pounds each—total weight same as above, forty pounds—and under the present system all four pieces will be sold on a basis of ten pounds each, whereas the fact is that two of them are three times as heavy in material and weaving, one or both, as the other pieces. The above is, of course, an instance only, but it illustrates the principle.

The inexactness of the method of determining the yard weight of textile fabrics by averaging the bale, as above suggested, in recent years proved so unsatisfactory that a demand has arisen for some means of determining with more certainty the yard weight of each particular piece, bolt, or cut of goods, and the necessity for so doing has become so great in certain industries that the custom has arisen of putting each separate piece of fabric upon a scale, and then by a laborious and time-taking process figuring out the yard weight of each piece. This process adds considerably to the expense of marketing the goods in large factories where the output is frequently hundreds of thousands of pieces annually.

Referring now to the subject-matter of my present invention, it comprises, generally speaking, a machine or apparatus provided with a platform similar to the platform of an ordinary scale, adapted to receive a piece, bolt, or cut of cloth, or a number of such pieces, as desired; also, a balance-beam and indicating-drum, the beam and the drum being connected together by certain mechanical appliances, so that upon the beam the weight of the piece can be instantly ascertained, and upon the drum the yard weight—that is to say, the number of running yards or fractions of a yard to the pound, which, as above stated, is known to the trade as the "yard weight" of the goods. It will be observed, however, that this term is a complete misnomer. To say that a piece of goods runs 7.75 yards to the pound does not give the weight per yard. To ascertain that weight a mathematical problem has to be worked out, which would frequently be a complicated one. Nevertheless, this so-called "yard weight" in the trade vocabulary is what is wanted, because manufacturers and dealers wish to know the proportion in yards to the pound, since the raw material—to wit, the cotton—is bought by the pound, and my apparatus will fulfill this desire of the trade equally well whether the scale-beam, as will be hereinafter explained, be marked with indications giving the weight of the goods or not. I prefer to add such indications as a matter of convenience, because thereby the weight can be ascertained without extra trouble, and it may sometimes be useful.

Moreover my invention is applicable to the old method employed of determining the quality or standard of woolen or certain other manufactures, wherein the weight of the goods in ounces or fractions of ounces is determined by the yard, all that is necessary being to modify the indications upon my drum-indices, which will be hereinafter explained, to adapt the apparatus to registration of that information, instead of the more modern yard-weight number of yards to the pound.

The mechanism constituting my apparatus or machine is as follows, reference being had to the drawings forming part of this application, in which—

Figure 2:
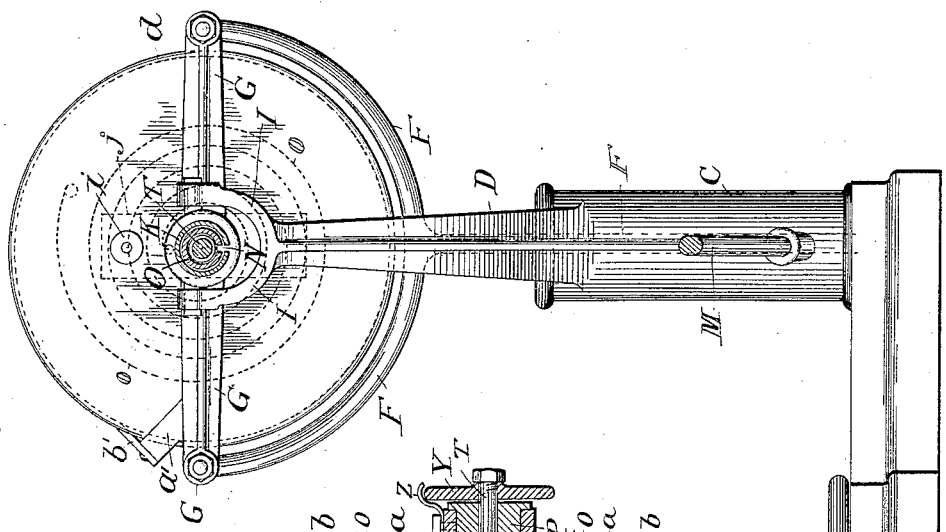
Figure 3:
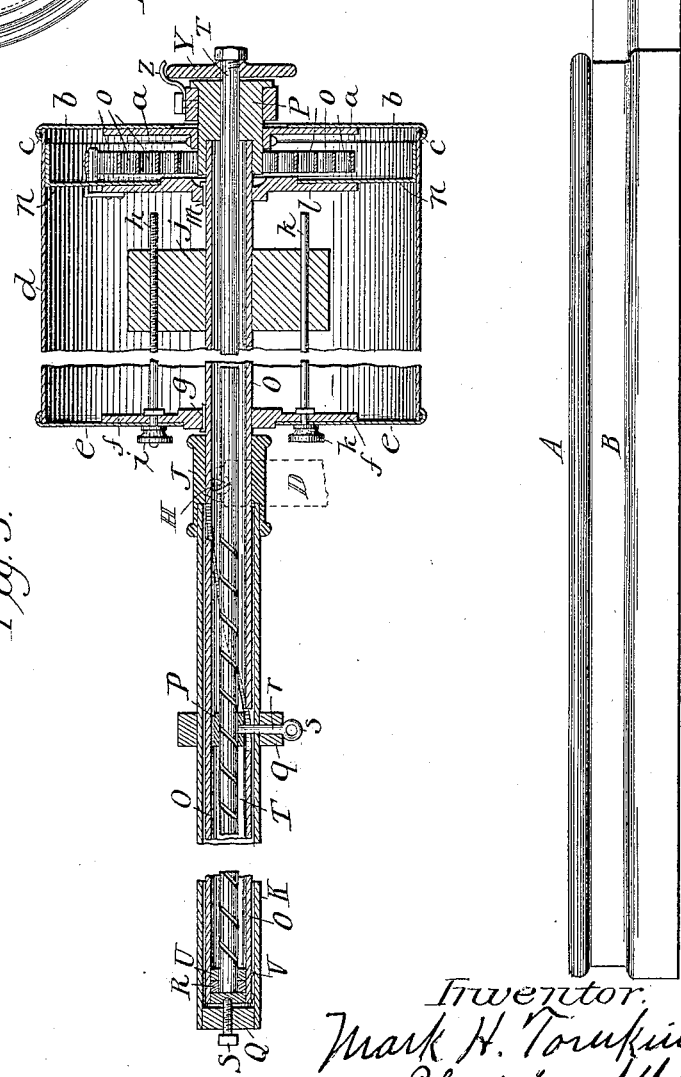
Figure 4:
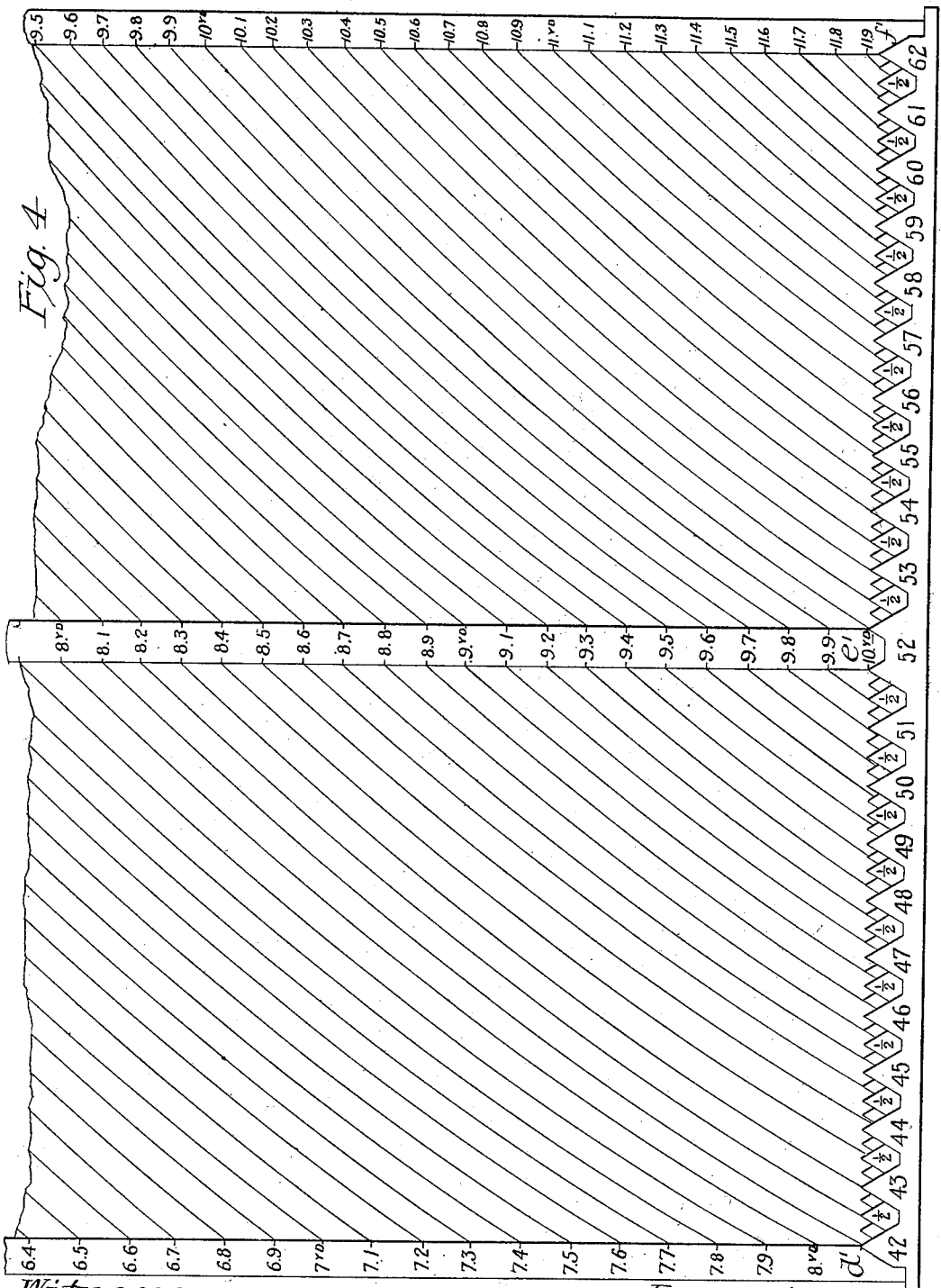

Figure 1 illustrates a front elevation of the apparatus. Fig. 2 illustrates a side elevation. Fig. 3 illustrates a longitudinal partially-sectional view of the drum scale-beam and the interior parts of the mechanism, some shown in full lines and some in sectioned lines. Fig. 4 illustrates a diagrammatical view of a segment of the face of the drum, illustrated as flattened out.

A is the platform of what may be an ordinary platform-scale.

B is the box of the scale within which the usual weighing-levers, &c., are inclosed.

C is the standard of the scale.

D is a brace extending from the standard upon which the scale-beam, drum, &c., are supported.

F is the connecting-rod which transmits the weight from the platform to the beam. It is bifurcated at its upper end and there connects with the frame G of the apparatus.

H are the usual knife-edges which fulcrum upon the bifurcated upper end I of the standard D. The knife-edges are made integral with a hub J.

K is a fixed tube which is entered into the forward end of the hub J, (see Fig. 3,) and its outer end passes through a longitudinally-slotted or ring-like arrest L supported upon a rod M, as usual in such apparatus. The tube K has a straight slot N (see Fig. 2) running substantially its entire length and preferably on its under side to prevent the entrance of dust. O is another tube which passes longitudinally through the tube K', likewise through the hub J and through the drum hereinafter to be explained, and is rigidly fastened within a hub P. (See Figs. 1 and 3.) This tube O has a spiral slot cut in it longitudinally, the pitch of which, near to the drum, is somewhat high, but which lowers as it approaches the outer end of the tube.

Q is a plug in the end of the tube K, and R is a similar plug in the end of the tube O.

S is a centering screw, which is threaded in the plug Q, the conical point of which enters the hollow center in the plug R, for the purpose of centering and preventing end motion on the part of the tube O and the mechanism connected with it.

T is a rod which extends longitudinally through the tube O and which is threaded, as indicated in Fig. 3, with a screw of quick pitch, throughout that portion of it, over which the pea (hereinafter to be explained) travels. On the forward end of the rod T there is a fixed collar U which is located between the plug R and the retaining-collar V which is fixed to the tube O, so that the front end of the rod T will be accurately centered and retained in position, and yet adapted to rotation on a longitudinal axis. The other end of the rod T passes through a hole made in the hub P, which it fits with reasonable snugness, and a small hand-wheel Y is fixed on the end thereof. The periphery of the hand-wheel is marked with divisions indicating pounds and fractions of pounds, and a little stationary index-finger Z, adjacent to the periphery of this wheel, acts as an index for it. By these means minute divisions of weight which might be difficult to determine from the scale-beam can be ascertained.

Referring now more particularly to the drum, $a$ is a centrally-bored and flanged disk, which is fastened by screws, as indicated, to the hub P. $b$ is one of the drum-heads fastened to the disk $a$, the periphery of which is rolled free, as shown at $c$, partly to give a finish and partly to protect the edge of the cylindrical portion of the drum, which revolves beneath it, and to prevent entrance of dust, &c. $d$ is a cylindrical portion of the drum, which may be made of brass or other suitable metal, and upon which the curved and gradually-diverging lines which form the main index of the apparatus are produced, as hereinafter described. $e$ is the other head of the drum. It is of the same size as the head $b$, and may be made of the same material, and it is rigidly fastened to another centrally-bored disk $f$, which is fixed by a key $g$ to the tube O. $h$ is a rod or spindle, which passes through the head $e$ and the disk $f$ and is provided with a thumb-nut $i$ on the outside of the drum whereby it may be turned. It is threaded near its point, and it passes through a threaded hole in an adjustable balance-weight $j$ inclosed within the drum. $k$ is another spindle, not threaded, which passes through a non-threaded hole in the bottom of the weight, so as to retain it in proper position to enable the upper spindle $h$, when turned, to rotate the weight backwardly and forwardly within the drum, as may be necessary for the purpose of adjustment. $l$ is still another centrally-bored disk of metal, which is keyed by a key $m$ to the rod O, and to it is attached a diaphragm-plate $n$, which projects radially and bears against the cylindrical portion of the drum. $o$ is a spring, one end of which is fastened to the fixed hub P, and the other or free end is fastened to the diaphragm $n$. $p$ is a nut interiorly threaded to correspond to the quick-pitch threads on the rod T. $q$ is a pea adapted to slide along the surface of the exterior tube K. $r$ is a pin which passes through the lower portion of the pea, likewise through the straight slot in the under side of the tube K, also through the curved slot in the interior tube O, and is rigidly threaded into the nut $p$. An eye $s$ is preferably made upon the lower end of this pin, upon which a pendant of any desired weight may be hung. $u$ is a frame extending upwardly from the standard C, the upper end of which is a hand-rest $v$, upon which the wrist of the operator may rest while securing the proper adjustment of balance by means of the hand-wheel Y.

Referring now to the indices upon the drum, $a'$ $a'$ (see Fig. 2) are two arms extending upwardly from the main frame G, and across their outer ends extends an index-plate $b'$, the edge of which is made in the form of a series of properly-spaced points or indices $c'$ $c'$, &c. The periphery of the drum (see Fig. 4) is provided with three circumferential, flat, and tape-like surfaces $d'$ $e'$ $f'$ upon which numerals are placed, as shown in said figure, the purpose of which will be hereinafter explained, and the surface of the drum between these tabular indices is provided with curved and gradually-divergent lines for a purpose hereinafter to be explained.

The operation of the apparatus is as follows: The piece, bolt or cut of cloth is placed upon the platform of the scale and the pea is moved along the scale-beam by turning the hand-wheel Y, which, in turn, rotates the rod T, and consequently, through the instrumentality of the nut $p$ and pin $r$, causes the pea $q$ to travel until the counterbalance is secured, and during the movement of the pea it will be observed that the pin $r$, acting in the slot in the inner tube O, has rotated the drum which is keyed fast to that tube, and when the counterbalance, as above stated, has been secured, all that is necessary to do is to read from the index-plate $b'$ in conjunction with the numerical indices upon the drum the number of yards to the pound as thereon indicated, said indices, of course, being prepared for this purpose—that is to say, assuming that the piece, bolt, or cut of fabric is forty-five and three-fourths yards in length, the stamp put by the manufacturer upon the corner of the cloth indicating that by the figures $45^3$. Now, upon finding the position of $45^3$ on the index-plate $b'$ (see Fig. 4) the operator observes the curved line which coincides with the said index-point $45^3$, and following that upwardly he discovers in the nearest index-plate that that line runs up 8.8. This shows that there are eight and eight-tenths yards to the pound in that piece of goods, and thus around the entire periphery of the drum. The purpose of the spring $o$ is to always maintain contact between all parts of the apparatus, so that lost motion or wear will not throw the apparatus out of true indication, and the weight $j$ within the drum is provided so that as it is moved slightly toward or from the supporting knife-edges adjustments may be made for any wear or lost motion. Thus the instrument is permanently maintained in a condition of great accuracy. The pea $r$ may be operated by the hand-wheel Y both forwardly and backwardly along the scale-beam.

The curved and gradually-divergent lines upon the surface of the drum and the indications upon the circumferential index-plates may be so divided and arranged as to fit the requirements of any special industry. For instance, the cotton trade recognizes no fractions of a yard less than quarters, and their unit of weight, so to speak, is the "pound." Consequently, this apparatus is illustrated in these drawings as made upon that basis, but for other trades or manufactures other denominations, weights, or arrangements may be necessary—as, for instance, in the woolen trade, already referred to, for which the lines upon the drum and the indices upon the index-plates will have to be worked out to suit the necessities of each case.

It will be obvious to those who are familiar with such devices that various modifications may be made in the details of construction of the parts without departing from the essentials of the invention, and I therefore do not limit myself to the details of construction, excepting as hereinafter specifically claimed.

In explanation of the drawings, I wish to state that it has been found difficult to make the curved lines on Fig. 4 of the drawings with sufficient accuracy to show their exact curvature, whereby gradually increasing divergence is secured, as they are in the actual machine; but upon counting the number of lines across the top of the figure as compared with the number across the bottom, just above the index-plate, it will be found that there are thirty-two of these lines at the upper part of the figure and thirty-nine at the lower part, thus showing that seven of them have diverged out of existence. In other words, more lines have gone out than have come in in the section of the drum shown in the drawings.

Having described my invention, I claim—

1. In an instrument for the purpose stated, the combination of a platform scale, a slotted beam, a slotted tube within the beam, a drum bearing indices fast on said tube, a threaded rod and nut, a pea and a pin engaging with the pea and passing through the slot in the beam and in the interior tube and entering the said nut, for the purposes set forth.

2. In an instrument for the purposes stated, the combination of a platform scale, a slotted beam, a slotted tube within the beam, a drum bearing indices fast to said tube, a threaded rod and nut, a pea, a pin engaging with the pea, and passing through the slots in the beam, and in the interior tube and entering the nut, and a hand-wheel on the end of the threaded rod, for the purposes set forth.

3. In an instrument for the purposes stated, the combination of a platform scale, a slotted beam, a slotted tube within the beam, a drum bearing indices fast on said tube, a threaded rod and nut, a pea, a pin engaging with the pea, and passing through the slots in the beam and in the interior tube, and entering the said nut and a spring engaging with the said drum, for the purposes set forth.

4. In an instrument for the purposes stated, the combination of a pea supported upon a scale beam, an indicating drum, a tube or rod having a slot or equivalent device of uneven pitch, and which supports the drum, and which is connected with the pea and rotated by its movement, and means to positively move the pea for the purposes set forth.

5. In an instrument for the purposes stated, the combination of an indicating drum supported upon a tube or rod, having a slot or equivalent device of uneven pitch, said tube or rod itself, a scale beam, a pea adapted to longitudinal movement on the scale beam, and provided with a pin or projection which engages with the slot or like device in said tube or rod, whereby the movement of the pea rotates the drum, for the purposes set forth.

Signed at New York, in the county of New York and State of New York, this 28th day of May, A. D. 1895.

MARK H. TOMKINS.

Witnesses:
PHILLIPS ABBOTT,
D. SOLIS RITTERBAND.